United States Patent
Kikuchi

[11] 3,921,339
[45] Nov. 25, 1975

[54] APPARATUS FOR GENERATING TROCHOIDAL SURFACES

[75] Inventor: Makoto Kikuchi, Kariya, Japan

[73] Assignee: Toyoda Koki Kabushiki Kaisha, Japan

[22] Filed: July 15, 1974

[21] Appl. No.: 488,844

[30] Foreign Application Priority Data
July 20, 1973 Japan .............................. 48-81133

[52] U.S. Cl. ............... 51/34 J; 51/50 R; 51/165.93; 51/DIG. 32
[51] Int. Cl.² .................... B24B 19/08; B24B 41/06
[58] Field of Search ...... 51/33 W, 34 J, 50 R, 50 H, 51/105 R, 90 R, 165.93; 90/15 A, 15 R, 15 B, 11, 13

[56] References Cited
UNITED STATES PATENTS

| | | | |
|---|---|---|---|
| 2,870,578 | 1/1959 | Baier | 51/90 R |
| 3,757,474 | 9/1973 | Pedersen | 51/33 W |

FOREIGN PATENTS OR APPLICATIONS

| | | | |
|---|---|---|---|
| 1,239,213 | 4/1967 | Germany | 51/DIG. 30 |

*Primary Examiner*—Donald G. Kelly
*Attorney, Agent, or Firm*—Wenderoth, Lind & Ponack

[57] ABSTRACT

An apparatus for generating a trochoidal surface includes a crank mechanism having an adjustable eccentric coupling connected at an eccentric portion with an oscillating table for imparting an orbital motion in a plane to the oscillating table, on which a support head is adjustably mounted for adjustment of relative position thereof. A work-support spindle is rotatably borne on the support head to rotate a workpiece about the axis thereof in addition to the orbital motion. A universal coupling is provided to transmit the rotation of the eccentric portion to the work-support spindle with a predetermined ratio even where the support head is adjusted to any desired position, so that the radius of the trochoidal surface may be adjustable as well as the eccentricity depending upon the eccentric coupling.

7 Claims, 4 Drawing Figures

APPARATUS FOR GENERATING TROCHOIDAL SURFACES

BACKGROUND OF THE INVENTION

The invention relates to an apparatus for machining trochoidal surfaces, in particular the interior surface of the rotor housing of a rotary engine, by the generation method, and aims to provide an apparatus for generating trochoidal surfaces which is simple in arrangement and has an increased rigidity and machining precision while permitting an easy change and adjustment of various dimensions of the trochoidal surfaces generated such as the generated radius, eccentricity and angle of oscillation.

A conventional apparatus for machining trochoidal surfaces by the generation method involves the use of a number of gears as well as an epicyclic gearing and/or a dual bearing mechanism incorporating eccentric sleeves. The use of such apparatus results in the presence of backlash in the gears and play in the bearings, rendering it extremely difficult to achieve a high machining precision. In addition, with the conventional apparatus, an extremely intricate operation is required such as replacing gears when it is desired to change the dimensions of the trochoidal surfaces generated.

SUMMARY OF THE INVENTION

The invention overcomes the above difficulties by reducing the number of gears required in the generation motion and by avoiding the use of the dual bearing mechanism incorporating eccentric sleeves and epicyclic gearing while permitting a ready change in the dimensions of the trochoidal surfaces generated without requiring a replacement of gears.

BRIEF DESCRIPTION OF THE DRAWINGS

The above and other objects, features and advantages of the invention will become apparent as the description proceeds with reference to the attached drawings, wherein.

DETAILED DESCRIPTION OF THE INVENTION

Figure 1:
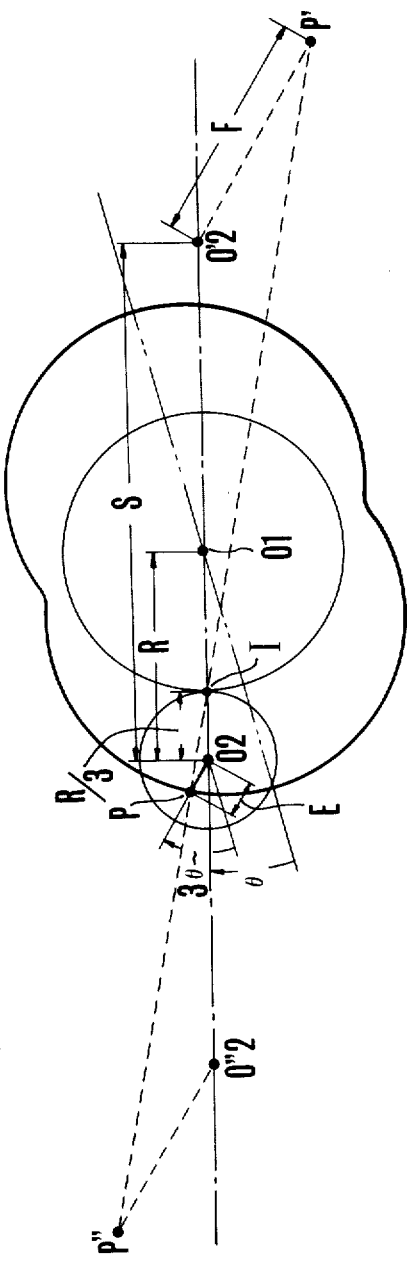
FIG. 1 is a diagram illustrating the principle on which the invention is based.

Before describing the invention fully, the principle of generating a two-lobed epitrochoidal curve will be described with reference to FIG. 1. As is well known, a two-lobed epitrochoidal curve is defined as the locus which a point P traces relative to a stationary plane when it rotates with an angular velocity of 3 $\omega$ and an eccentricity of E around a point 02 which in turn rotates around a fixed point 01 with an angular velocity of $\omega$ in the same direction as that in which the point P rotates, the points 01 and 02 being spaced by a generated radius of R. As will be apparent, the locus traced by the point P will also depict the two-lobed epitrochoidal curve relative to the plane when this point is rotated around the point 02 with the same eccentricity of E but with a different angular velocity of 2 $\omega$ and when the plane is rotated in the opposite direction around the point 01 with an angular velocity of $\omega$. A normal to the two-lobed epitrochoidal curve at the point P always passes through a point I which internally divides the line segment $\overline{02\text{-}01}$ at a ratio of 1:2. The generation of a trochoidal surface according to the invention is based on this principle.

The grinding machine for generating the interior surface of a rotary engine according to one embodiment of the invention will be described below with reference to FIGS. 2 to 4. There is shown a bed 1, and an annular hydrostatic plane bearing member 2 having formed a pair of vertically opposite and parallel bearing surfaces 2a and 2b in its inner periphery is secured centrally on the bed 1 in a horizontal position. A stationary base 3 is fixedly disposed below the bearing member 2. An oscillating table 4 has its peripheral flange interposed between the bearing surfaces 2a, 2b of the bearing member 2 so as to be freely movable in the horizontal direction. A first eccentric shaft 5 is rotatably journaled near the center of the oscillating table 4 and extends vertically, while a drive shaft 6 is rotatably journaled in the stationary base 3. The upper end of the drive shaft 6 and the bottom end of the first eccentric shaft 5 are connected together by means of an eccentric coupling 7 so that the spacing between these shafts is equal to the eccentricity E of the two-lobed epitrochoidal curve. The eccentric coupling 7 comprises a pair of upper and lower members 7a and 7b which slidably engage with each other along their dovetailed guide surfaces. The relative position of engagement between the upper and lower members 7a and 7b, or the spacing between the first eccentric shaft 5 and the drive shaft 6 can be adjusted by an eccentricity adjusting bolt 8.

Secured to the bottom end of the drive shaft 6 is a worm gear 10 which meshes with a worm 12 that is fixedly mounted on the output shaft of a hydraulic motor 11 fixedly mounted on the stationary base 3, the motor 11 serving to drive a workpiece. A crank or rocking shaft 15 is rotatably journaled in the oscillating table 4 at a distance of S from the first eccentric shaft 5, and a gear 16 fixedly mounted on the rocking shaft 15 meshes with a gear 17 fixedly mounted on the first eccentric shaft 5 through an intermediate gear 18, the gears 16 and 17 having the same number of teeth. A second eccentric shaft 20 is coupled to the bottom end of the rocking shaft 15 through an eccentric coupling 21 and spaced by a distance of F from the rocking shaft 15 in a direction parallel to the direction in which the first eccentric shaft 5 is spaced with respect to the drive shaft 6. As with the eccentric coupling 7, the eccentric coupling 21 comprises a pair of upper and lower members 21a and 21b, and the spacing F between the rocking shaft 15 and the second eccentric shaft 20 is adjusted by an angle of oscillation adjusting bolt 22 in a manner such that the following relationship applies between the generated radius R of the two-lobed epitrochoidal curve, the eccentricity E and the distance S between the first eccentric shaft and the rocking shaft 15:

$$F = E (3S/R - 1)$$

Thus, the axis of the first eccentric shaft 5 corresponds to the point 02 shown in FIG. 1, the axis of the drive shaft 6 to the point P, the axis of the rocking shaft 15 to the point 0'2, and the axis of the second eccentric shaft 20 to the point P'. As a consequence, denoting the point by I which is by one-third of the generated radius R of the two-lobed epitrochoidal curve, or R/3, spaced from the point 02 on the line segment joining the points 02 and 0'2 in FIG. 1, it will be appreciated that the triangle I02P and the triangle IO'2P' are similar to each other.

A slide 23 is rotatably mounted on the second eccentric shaft 20, and a guide groove 24 is formed in the stationary base 3 in a direction running perpendicular to the axis P of the drive shaft 6, whereby the slide 23 is slidably received within the guide groove 24.

Figure 4:
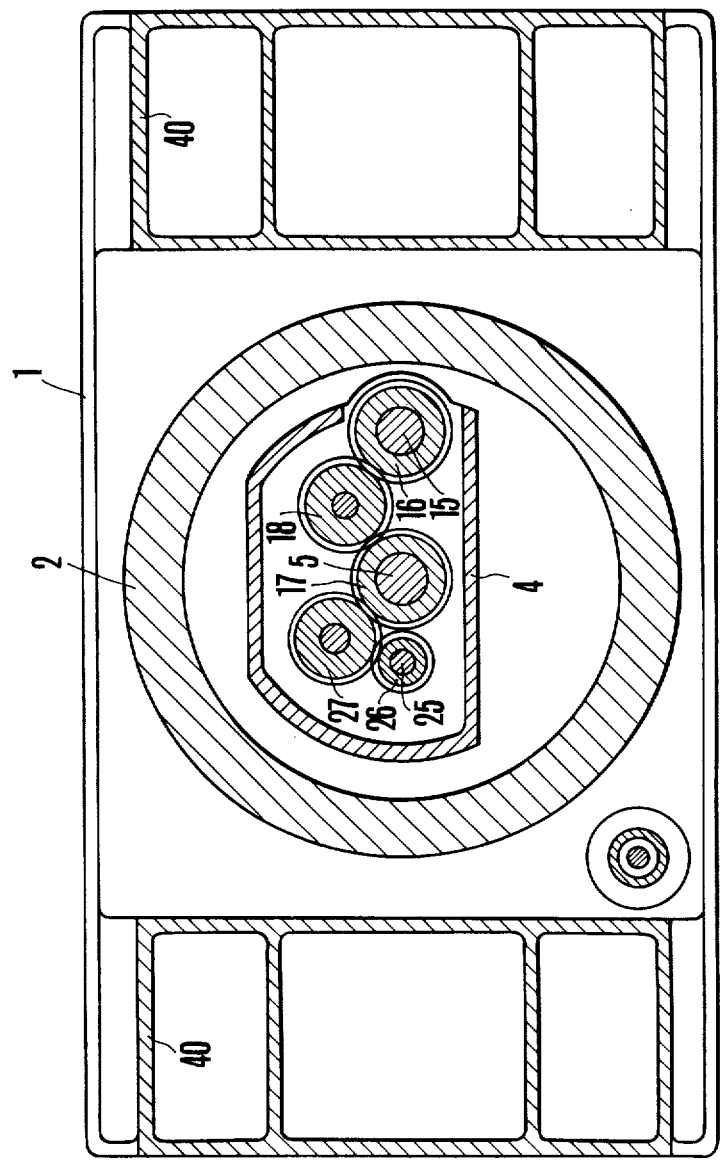
FIG. 4 is a cross section taken along the line IV—IV shown in FIG. 2.

A first transmission shaft 25 for the main spindle is rotatably journalled in the oscillating table 4, and a gear 26 fixedly mounted on this transmission shaft 25 meshes with the gear 17 on the first eccentric shaft 5 through an intermediate gear 27 (FIG. 4). A support head or headstock 30 is mounted on the oscillating table 4 so as to be movable in a plane which includes the axis $O_2$ of the first eccentric shaft 5 and the axis $O'_2$ of the rocking shaft 15, and is adapted to have the amount of its movement adjusted by a generated radius adjusting bolt 31. A main spindle 32 is rotatably journaled in the headstock 30 in a manner such that its axis $O_1$ is spaced from the axis $O_2$ by a distance corresponding to the generated radius R of the two-lobed epitrochoidal curve in the common plane with the axes $O_2$, $O'_2$ of the first eccentric shaft 5 and the rocking shaft 15. The spacing R between the main spindle 32 and the first eccentric shaft 5 is adjusted by the generated radius adjusting bolt 31. Mounted on top of the main spindle 32 is a workpiece mounting jig 33 which serves for mounting the rotor housing W of a rotary engine as a workpiece. A main spindle drive gear 35 is fixedly mounted on the main spindle 32, and meshes with a gear 37 which is fixedly mounted on a second transmission shaft 36 which is in turn rotatably journaled in the headstock 30. The bottom end of the second transmission shaft 36 and the top end of the first transmission shaft 25 are coupled together by an Oldham's coupling 39 in order to assure a smooth transmission of a rotating motion between these shafts if the eccentricity of these shafts varies. The gear ratio of the gear 17 on the first eccentric shaft 5 and the gear 26 on the first transmission shaft 25 as well as the gear ratio of the gear 37 on the second transmission shaft 36 and the main spindle drive gear 35 are selected such that the rotation of the first eccentric shaft 5 is transmitted to the main spindle 32 with a speed reduction of 2:1.

Figure 2:
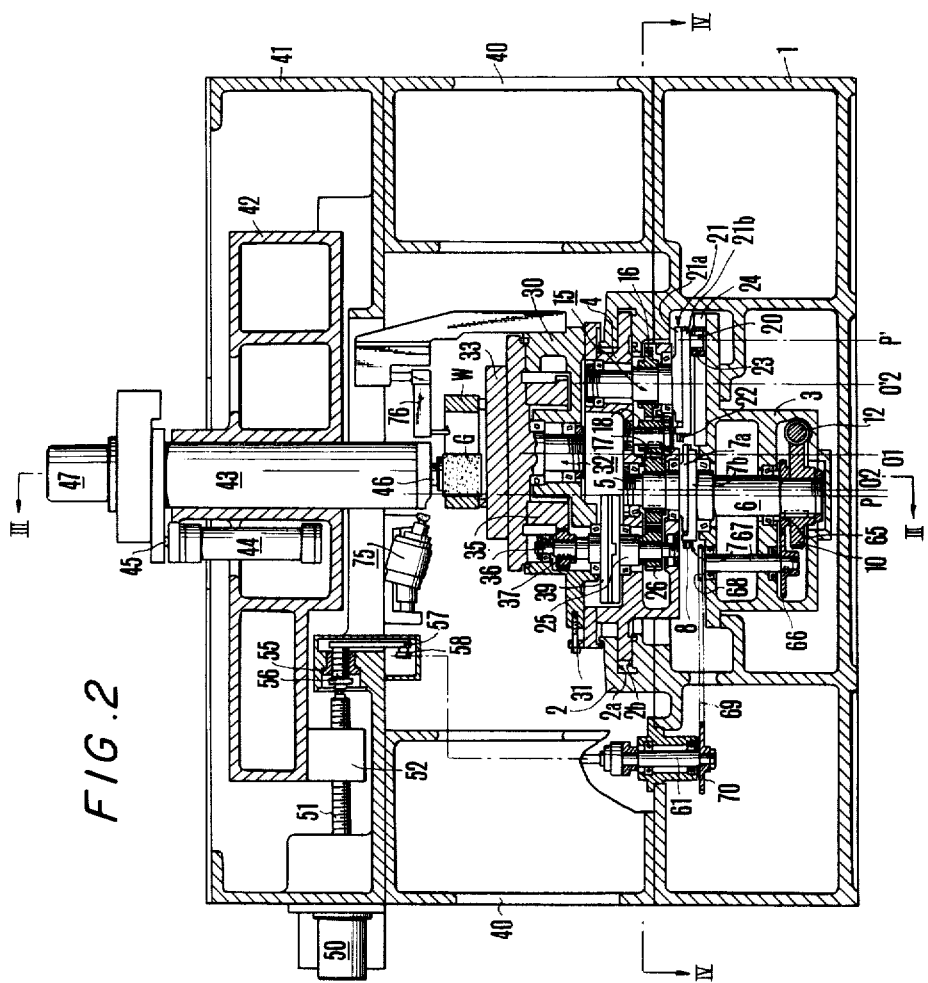
FIG. 2 is a longitudinal section of the apparatus according to one embodiment of the invention.
Figure 3:
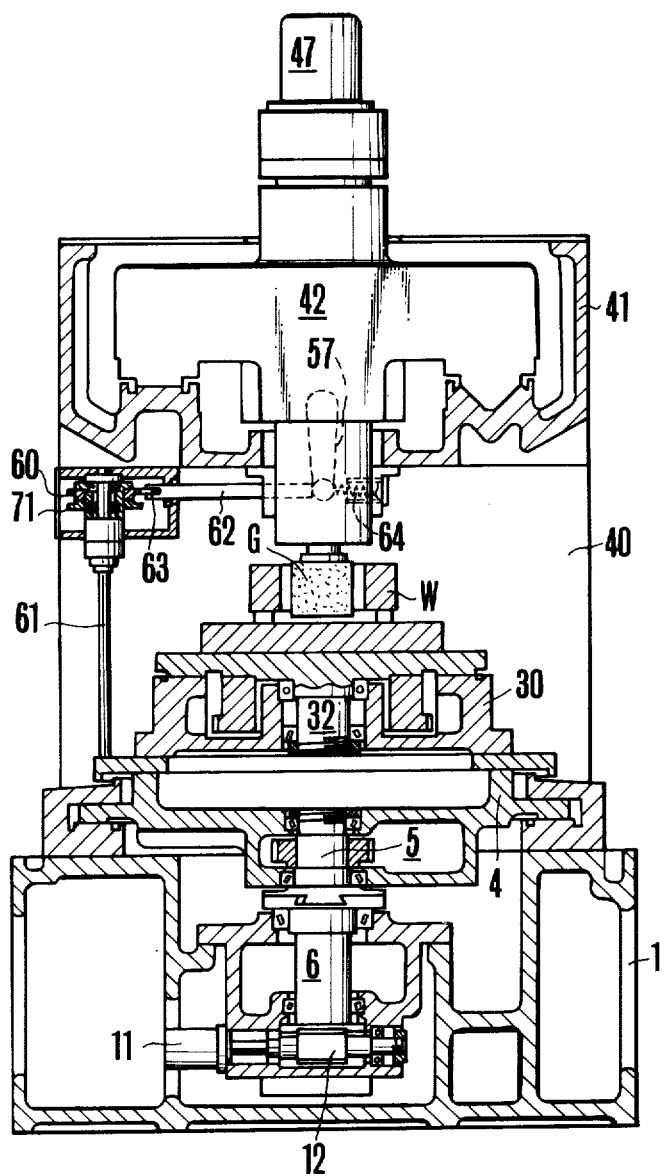
FIG. 3 is a cross section taken substantially along the line III—III shown in FIG. 2.

As indicated in FIG. 2, a pair of columns 40, 40 are secured on the bed 1 to the right and to the left of the headstock 30, and horizontally carries a tool base 41 on top thereof, the base 41 being secured to the columns. Resting on the tool base 41 is a tool rest 42 which is translatable in the same direction as that in which the guide groove 24 extends. Vertically journaled within and slidable vertically of the tool rest 42 is a wheel spindle ram 43 which is connected with a piston rod 45 of a piston received within a cylinder 44 fixedly mounted on the tool rest 42, the cylinder 44 serving to move the wheel spindle ram up and down. A wheel spindle 46 is rotatably journaled within the ram 43 with its axis disposed in a vertical plane including the centerline of the guide groove 24, and mounted on the bottom end of the wheel spindle 46 is a grinding wheel G, the wheel spindle being adapted to be driven for rotation by a drive motor 47 fixedly mounted on the top end of the ram 43 for the purpose of grinding the interior surface of a workpiece W. A pulse motor 50 for feeding the tool rest is fixedly mounted on the tool base 41, and the output shaft of the pulse motor 50 is coupled with a threaded feed shaft 51 in a manner to transmit only the rotation thereof, the threaded shaft 51 threadably engaging a feed nut 52 which is secured to the bottom surface of the tool rest 42.

A profile truing nut 55 is secured to the tool base 41 in alignment with the axis of the threaded feed shaft 51 and is threadably engaged by a profile truing threaded shaft 56, which is engaged at its one end by the threaded feed shaft 51 which is urged thereto by a cylinder, not shown, and the other end of which has secured thereto a rocking lever 57 carrying a follower roller 58 at its forward end. As indicated in FIG. 3 a profile truing cam 60 is rotatably carried by a cam shaft 61 at a position below the tool base 41. A cam follower member 62 is mounted to be slidable horizontally with its one end bearing against the profile truing cam 60 through a follower roller 63 and with its other end being engaged by the follower roller 58 on the rocking lever 57 which is urged thereto by a spring 64. The rotation of the drive shaft 6 is transmitted to the cam shaft 61 through a reduction gearing comprising the gears 65, 66, rotary shaft 67, chain wheel 68, chain 69 and another chain wheel 70. Also fixedly mounted on the cam shaft 61 is a peripheral speed correcting cam 71, which is engaged by a follower, not shown, which serves for controlling a flow control valve to control the amount of hydraulic fluid to be admitted into or displaced from the hydraulic motor 11. In the drawings, a rotary dresser mounted on the tool base 41 is shown at 75, and a sizing device 76 is shown as mounted on the headstock 30.

The apparatus described above operates as follows:

When the hydraulic motor 11 for driving the workpiece is set in motion, its power output is transmitted through the worm 12 and the worm gear 10 to rotate the drive shaft 6, whereby the first eccentric shaft 5 is caused to revolve around the axis P of the drive shaft 6, thus causing the oscillating table 4 to revolve about the axis P. At the same time, the first eccentric shaft 5 rotates relative to the oscillating table 4 with the same angular speed $\omega$ and in the same direction as the drive shaft 6, such rotation being transmitted to the main spindle 32 through the gears 17, 27, 26, first transmission shaft 25, the Oldham's coupling 39, second transmission shaft 36 and gears 37, 35. As a consequence, the main spindle 32 rotates in the opposite direction with half the angular speed of the first eccentric shaft 5, or $\omega/2$, whereby the axis P of the drive shaft 6 traces a locus representing the two-lobed epitrochoidal curve relative to the workpiece W mounted on the main spindle 32.

The rotation of the first eccentric shaft 5 is transmitted to the rocking shaft 15 through the gears 17, 18, 16 causing this rocking shaft 15 and the second eccentric shaft 20 to rotate about the axis $O'_2$ with the same angular speed $\omega$ and in the same direction as the first eccentric shaft 5. Thereupon, the oscillating table 4 oscillates about the axis P, since the constraint on the slide 23 journaled on the second eccentric shaft 20 permits only its translational movement along the guide groove 24. As a result of such oscillation, the vertical line l through the oscillating table 4 which internally divides the line segment between the axes $O_2$ and $O_1$ with a ratio of 1:2 maintains its orthogonal relationship with the centerline of the guide groove 24. In other words, the normal at the axis P to the two-lobed epitrochoidal locus depicted by the axis P relative to the workpiece W remains in a vertical plane including the centerline of the guide groove 24. When the cylinder 44 for moving the wheel spindle ram up and down is operated to lower the wheel spindle ram 43, the grinding wheel G is inserted into the workpiece W. Under this condition, when the motor 47 is operated to cause the grinding wheel G to rotate and the pulse motor 50 for feeding the tool rest is operated in an in-feed direction, the threaded feed shaft 51 is rotated to advance the tool rest 42 to the left by its cooperation with the feed nut 52, thus allowing the grinding wheel G to cut into the workpiece W. As mentioned previously, since the grinding wheel G cuts into the workpiece while remaining in the vertical plane including the centerline of the guide groove 24, the axis of the grinding wheel G is maintained in orthogonal relationship with the normal at the axis P to the two-lobed epitrochoidal locus depicted by the axis P relative to the workpiece W. As a result, when the grinding wheel G has cut into the workpiece W to a depth such that the grinding point of the grinding wheel G is located on the axis P, the interior surface of the workpiece W will be worked into a true two-lobed epitrochoidal surface. A further depth of cut will result in a surface which is further removed in parallel manner from the true two-lobed epitrochoidal surface by an amount corresponding to the increased depth of the cut beyond the axis P.

On the other hand, the rotation of the drive shaft 6 is transmitted to the cam shaft 61 through the gears 65, 66, rotary shaft 67, chain wheel 68, chain 69 and chain wheel 70, whereupon the cam shaft 61 rotates in the same direction and with the same angular speed $\omega/2$ as the rotation of the workpiece W. Consequently, the cam follower member 62 is advanced or retracted according to the configuration of the profile truing cam 60, thereby rocking the rocking lever 57. This results in a rotation of the threaded shaft 56 integral with the rocking lever 57 to thereby advance or retract, whereby the threaded feed shaft 51 which is urged to this threaded shaft 56 either advances or retracts integrally with the tool rest 42. As a consequence, the interior surface of the workpiece W is worked to the true two-lobed epitrochoidal surface or a parallel enlarged version thereof as corrected according to the configuration of the profile truing cam 60. The number of revolutions at the output of the drive motor 11 is continuously varied by the cam 71 with a period corresponding to one revolution of the workpiece W, thereby maintaining the peripheral speed of the workpiece W constant.

From the foregoing, it will be appreciated that the eccentric drive for generating a trochoidal surface is formed by a crank mechanism comprising the drive shaft 6, the eccentric coupling 7 and the first eccentric shaft 5 in accordance with the invention, which results in the advantages that the drive obtains an increased mechanical rigidity and machining precision as compared with a conventional generating apparatus which uses an epicyclic gearing or a dual bearing mechanism incorporating eccentric sleeves. The spacing between the drive shaft 6 and the first eccentric shaft 5 and between the rocking shaft 15 and the second eccentric shaft 20, as well as the position of the headstock 30 relative to the oscillating table 4 can be easily changed and adjusted, thereby permitting an easy change or adjustment of the generated radius, eccentricity and angle of oscillation of the trochoidal curve.

While in the above described embodiment, the rocking shaft 15 and the second eccentric shaft 20 correspond to the points $\overline{0'2}$ and P' shown in FIG. 1, it is only necessary in the present invention that the rocking shaft and the second eccentric shaft be located at such positions that the axis of the rocking shaft lies on the line $\overline{02\text{-}1}$, that the axis of the second eccentric shaft lies on the line $\overline{IP}$, and that a triangle having its apices located on the point I and the axes of rocking shaft 15 and second eccentric shaft 20 be similar to the triangle I02P. For example, the rocking shaft may be located on the point 0''2 shown in FIG. 1 and the second eccentric shaft may be located on the point P''.

I claim:

1. In an apparatus for generating a trochoidal surface, said apparatus being of the type including an oscillating table movable in a plane; a crank mechanism means having an eccentric shaft connected with said oscillating table for imparting an orbital motion to said oscillating table; said crank mechanism means being provided with an eccentric coupling means for selectively adjusting the eccentricity of said eccentric shaft, a main spindle rotatably mounted on said oscillating table; gear transmission means for drivably connecting said eccentric shaft with said main spindle in a circumscribed gear relationship; and means for controlling the orientation of said oscillating table with respect to said orbital motion; the improvement comprising:

a support head rotatably supporting said main spindle and slidably mounted on said oscillating table;

regulating means for selectively positioning said support head relative to said oscillating table for thereby adjusting the space between said main spindle and said eccentric shaft; and a universal coupling means associated with said gear transmission means for maintaining a rotational ratio between said main spindle and said eccentric shaft at a predetermined value at any desired adjusted position of said support head.

2. The improvement claimed in claim 1, wherein said orientation control means comprises a crank shaft arranged on said oscillating table; gear means for transmitting rotation to said crank shaft from said eccentric shaft; a linear guide means for guiding an eccentric portion of said crank shaft; and second eccentric coupling means for selectively adjusting the eccentricity of said eccentric portion; whereby selective adjustments of said first-mentioned eccentric coupling means, said second coupling means and said universal coupling means provide that a desired size of trochoidal surface may be generated.

3. The improvement claimed in claim 1, further comprising a tool rest supporting a tool; feed means for moving said tool rest to feed said tool relative to a workpiece position on said support head; and profile truing means for truing the profile of a generated trochoidal surface by compensating the operation of said feed means in response to the operation of said crank mechanism.

4. The improvement claimed in claim 3, wherein said feed means comprises a feed nut secured to said tool rest; a threaded feed shaft threadably engaged by said feed nut; and a motor for driving said threaded feed shaft.

5. The improvement claimed in claim 4, wherein said profile truing device comprises a truing nut secured in axial alignment with the axis of said threaded feed shaft; a truing threaded shaft threadably engaging with said truing nut and having one end abutting against a free end of said threaded feed shaft; a rocking lever secured at one end thereof to the other end of said truing threaded shaft; a follower roller carried by the other end of said rocking lever; a cam shaft drivingly connected with said crank mechanism means; and a profile truing cam fixedly mounted on said cam shaft for operating said follower roller.

6. The improvement claimed in claim 1, further comprising a hydrostatic fluid bearing supporting said oscillating table.

7. The improvement claimed in claim 1, wherein said universal coupling comprises an Oldham's coupling.

* * * * *